(12) United States Patent
Block et al.

(10) Patent No.: US 12,188,511 B2
(45) Date of Patent: Jan. 7, 2025

(54) NUT CAP ASSEMBLY

(71) Applicant: THE BOEING COMPANY, Chicago, IL (US)

(72) Inventors: Samuel L. Block, Chicago, IL (US); Colin L Farr, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 412 days.

(21) Appl. No.: 17/702,612

(22) Filed: Mar. 23, 2022

(65) Prior Publication Data

US 2022/0389951 A1    Dec. 8, 2022

Related U.S. Application Data

(60) Provisional application No. 63/196,857, filed on Jun. 4, 2021.

(51) Int. Cl.
| | |
|---|---|
| *F16B 37/14* | (2006.01) |
| *B64F 5/10* | (2017.01) |
| *F16B 43/00* | (2006.01) |
| *F16B 39/28* | (2006.01) |

(52) U.S. Cl.
CPC ............... *F16B 37/14* (2013.01); *B64F 5/10* (2017.01); *F16B 43/001* (2013.01); *F16B 39/28* (2013.01)

(58) Field of Classification Search
CPC .............. F16B 23/0007; F16B 23/0061; F16B 23/0069; F16B 23/0076; F16B 31/02; F16B 37/14; F16B 39/28; F16B 41/005; F16B 43/001; B64F 5/10; Y10S 411/91

USPC ................... 411/372.5–372.6, 373, 429, 431
See application file for complete search history.

(56) References Cited

U.S. PATENT DOCUMENTS

| | | | |
|---|---|---|---|
| 2016/0159493 A1* | 6/2016 | Dobbin | F16B 33/004 411/82.1 |
| 2016/0169266 A1* | 6/2016 | Dobbin | F16B 37/14 156/60 |
| 2016/0195125 A1* | 7/2016 | Dobbin | B64D 45/02 411/372.6 |
| 2019/0301514 A1* | 10/2019 | Dobbin | F16B 37/14 |
| 2019/0301515 A1* | 10/2019 | Dobbin | F16B 33/004 |

\* cited by examiner

*Primary Examiner* — Roberta S Delisle

(74) *Attorney, Agent, or Firm* — Jay J. Hoette; The Small Patent Law Group, LLC

(57) ABSTRACT

A nut cap assembly for securing an internal component to an external component includes a seal cap having a base and a shroud extending from the base. The base includes a mounting flange configured to be mounted to the internal component. The base includes an opening at a mounting end of the base configured to be mounted to the internal component. The base includes a seal groove surrounding the opening configured to receive a seal. The seal groove is open at the mounting end to interface the seal with the internal component. The shroud includes a nut pocket has a cap anti-rotation feature. The nut cap assembly includes a nut received in the nut pocket. The nut includes a threaded bore configured to threadably receive a threaded fastener used to secure the internal component to the external component. The nut includes a nut anti-rotation feature interfacing with the cap anti-rotation feature.

20 Claims, 8 Drawing Sheets

NUT CAP ASSEMBLY

CROSS-REFERENCE TO RELATED APPLICATIONS

This application relates to and claims priority benefits from U.S. Provisional Patent Application No. 63/196,857, filed Jun. 4, 2021, which is hereby incorporated by reference in its entirety.

BACKGROUND OF THE DISCLOSURE

The subject matter herein relates generally to mechanical connectors.

Mechanical connectors are used to connect various component parts together, such as within an aircraft or other vehicle. Structural components are connected using nuts and bolts. However, some components may be difficult to access, such as being located interior of one or more component of the vehicle. Some known attachment systems use nut plates to hold the nuts in place for connection with the bolt from the other side of the component. However, locating the parts are problematic and the nuts may be misaligned in the nut plate leading to difficulties or improper attachment with the bolts. Additionally, sealing the nut plates may be difficult, which could lead to fluid leakage through the openings in the components. Separate sealing structures are known, but require additional assembly steps.

SUMMARY OF THE DISCLOSURE

A need exists for an attachment system and method in which component parts can be quickly and easily secured to each other.

With those needs in mind, certain embodiments of the present disclosure provide a nut cap assembly for securing an internal component to an external component. The nut cap assembly includes a seal cap having a base and a shroud extending from the base. The base includes a mounting flange configured to be mounted to the internal component. The base includes an opening at a mounting end of the base configured to be mounted to the internal component. The base includes a seal groove surrounding the opening configured to receive a seal. The seal groove is open at the mounting end to interface the seal with the internal component. The shroud includes a nut pocket has a cap anti-rotation feature. The nut cap assembly includes a nut received in the nut pocket. The nut includes a threaded bore configured to threadably receive a threaded fastener used to secure the internal component to the external component. The nut includes a nut anti-rotation feature interfacing with the cap anti-rotation feature.

Certain embodiments of the present disclosure provide a nut cap assembly for securing an internal component to an external component. The nut cap assembly includes a seal cap having a base and a shroud extending from the base. The base includes a mounting flange configured to be mounted to the internal component. The mounting flange has a mounting opening. The base includes an opening at a mounting end of the base configured to be mounted to the internal component. The base includes a seal groove surrounding the opening. The seal groove is open at the mounting end. The shroud includes a nut pocket having a cap anti-rotation feature. The nut cap assembly includes a mounting fastener received in the mounting opening. The mounting fastener includes a mounting seal providing a sealed interface between the mounting fastener and the internal component. The nut cap assembly includes a seal received in the seal groove. The seal provides a seal interface around the opening between the seal cap and the internal component. The nut cap assembly includes a nut received in the nut pocket. The nut includes a threaded bore configured to threadably receive a threaded fastener used to secure the internal component to the external component. The nut includes a nut anti-rotation feature interfacing with the cap anti-rotation feature.

Certain embodiments of the present disclosure provide a method of assembling an aircraft component including loading a nut in a nut pocket of a seal cap by interfacing a nut anti-rotation feature of the nut with a cap anti-rotation feature of the seal cap to prevent rotation of the nut in the nut pocket of the seal cap. The method mounts a mounting end of the seal cap to an inner surface of an internal component with a seal groove of the seal cap facing the internal component and provides a seal in the seal groove to seal between the seal cap and the internal component. The method threadably couples a threaded fastener to a threaded bore of the nut to secure an outer surface of the internal component to an external component. The threaded fastener is installed from an exterior of the external component.

DETAILED DESCRIPTION OF THE DISCLOSURE

Figure 1:
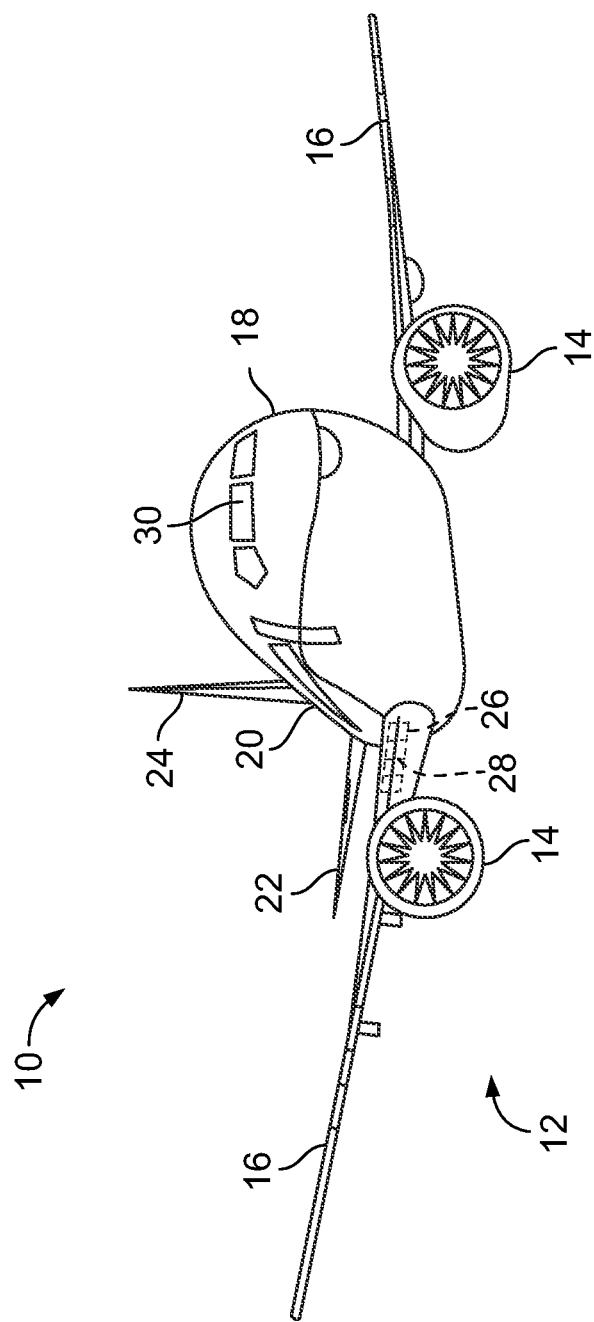
FIG. 1 illustrates a perspective front view of an aircraft, according to an embodiment of the present disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The aircraft 10 includes other systems, such as a fuel system to supply fuel to the engines. The fuel system includes fuel tanks 26 carried by the wings 16 and/or the fuselage 18. The aircraft 10 includes structural elements 28 (shown in phantom), such as frame members, spars, ribs, stringers, longerons, bulkheads, skin or other structural elements.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like.

The various components of the aircraft 10 are assembled together at an aircraft assembly plant. The components are connected together using fasteners. For example, at least some of the components of the aircraft 10 are assembled using threaded fasteners, such as nuts and bolts. According to various embodiments of the present disclosure, at least some of the bolts are blind attached to the nuts. For example, the nut may be held internally within one of the aircraft components (for example, within the interior of the fuel tank) and not visible to the assembler. The bolt is attached to the nut from the exterior of aircraft 10. The nut is held relative to the components such that the bolt may be attached to the nut by a single assembler without the need for a second assembler within the interior of the aircraft 10 or the structural component to hold the nut.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 2:
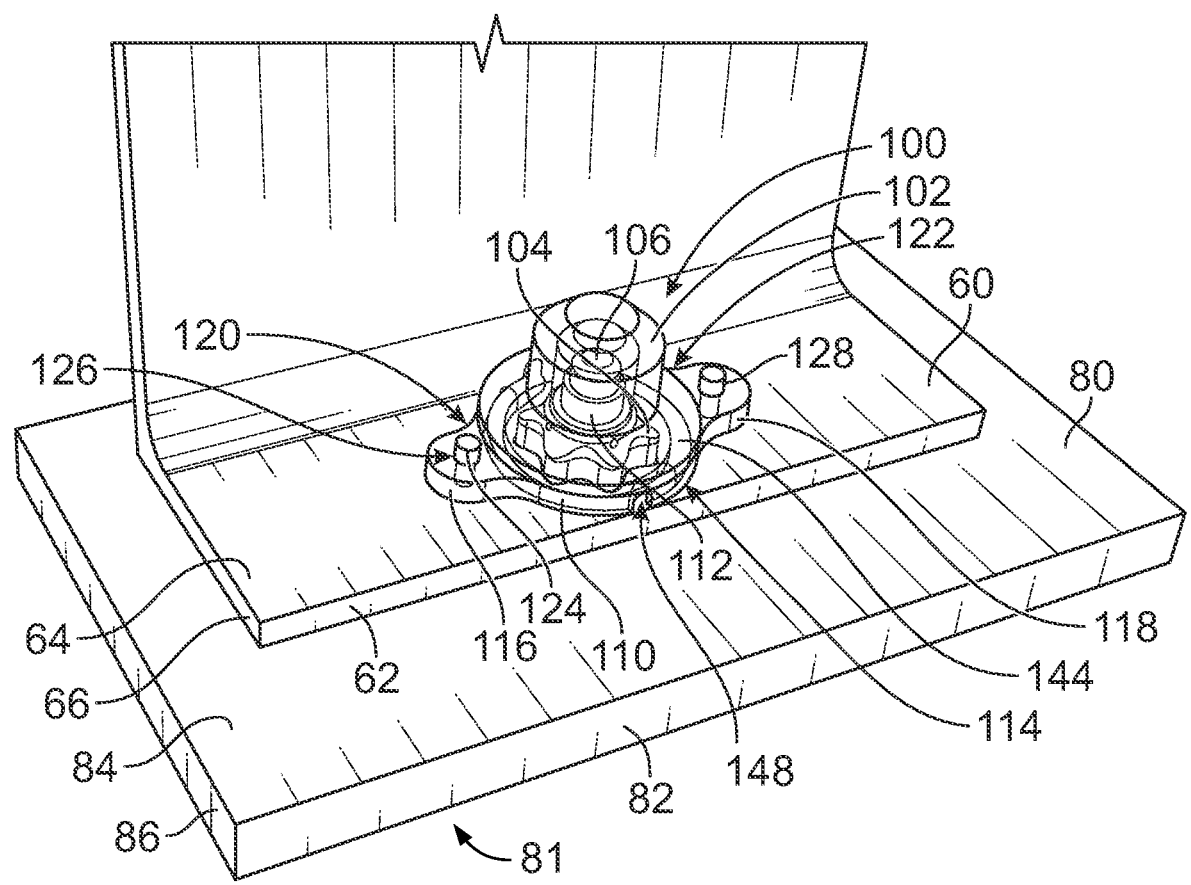
FIG. 2 is a perspective view of a nut cap assembly in accordance with an exemplary embodiment for securing an internal component to an external component.
Figure 3:
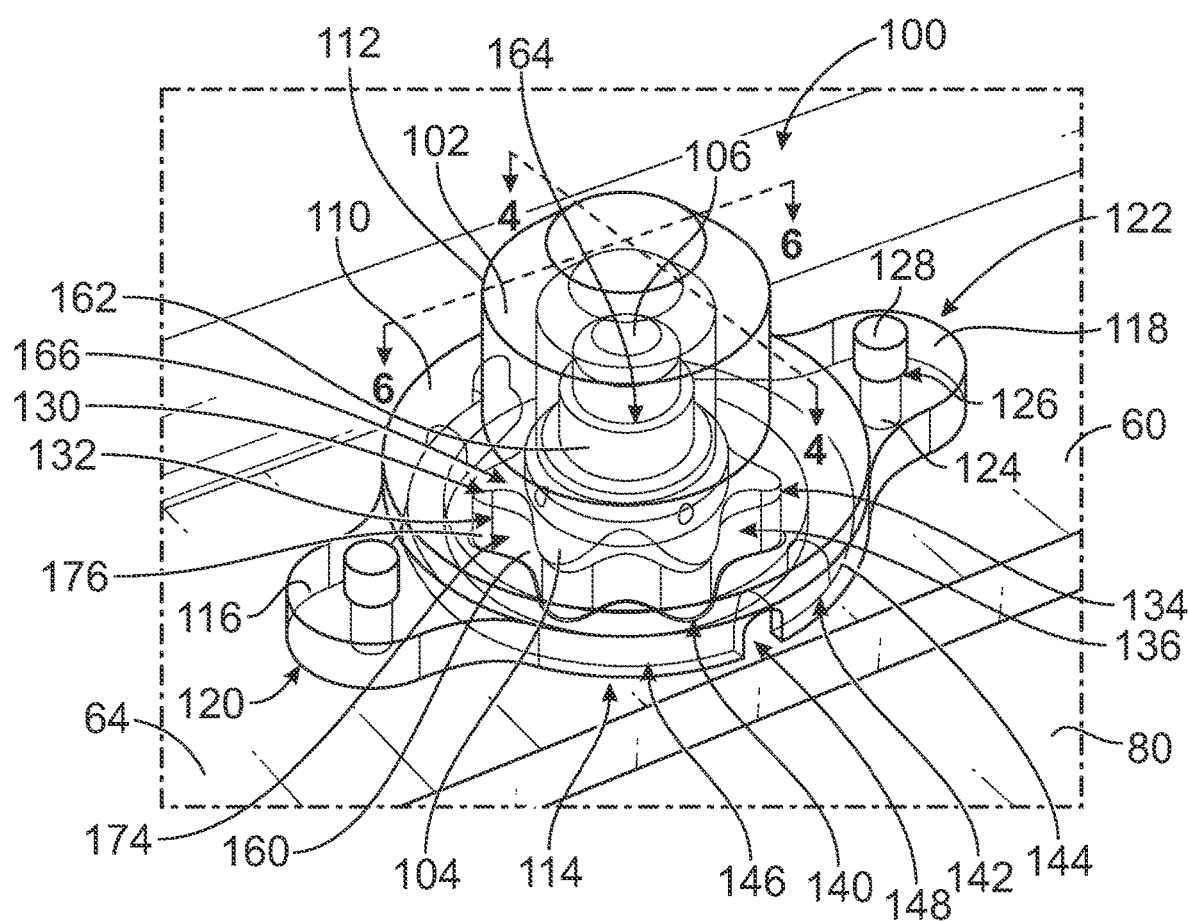
FIG. 3 is an enlarged view of the nut cap assembly in accordance with an exemplary embodiment.

FIG. 2 is a perspective view of a nut cap assembly 100 in accordance with an exemplary embodiment for securing an internal component 60 to an external component 80. FIG. 3 is an enlarged view of the nut cap assembly 100 in accordance with an exemplary embodiment. In at least one embodiment, the nut cap assembly 100 is configured to be installed by a single assembler. The nut cap assembly 100 may allow for blind mating and assembly. In at least one embodiment, portions of the nut cap assembly 100 are inaccessible to the assembler during assembly. For example, a portion of the nut cap assembly 100 may be internal to the components 60, 80 and inaccessible and another portion of the nut cap assembly 100 may be external to the components 60, 80 and accessible. In at least one embodiment, the nut cap assembly 100 provides a sealed interface with the internal component 60 and/or the external component 80. The nut cap assembly 100 prevents fluid leakage at the sealed interface. The nut cap assembly 100 provides lighting strike protection by isolating various conductive components.

The nut cap assembly 100 includes a seal cap 102, a nut 104 are held in the seal cap 102, and a threaded fastener 106 configured to be threadably coupled to the nut 104 to secure the internal component 60 to the external component 80. The seal cap 102 is configured to be sealingly coupled to the internal component 60 to provide a sealed enclosure around the nut 104. The seal cap 102 positions the nut 104 relative to the internal component 60 for mating with the threaded fastener 106. According to various embodiments of the present disclosure, the seal cap 102 and the nut 104 are held within the interior of the components and may be inaccessible during assembly. The threaded fastener 106 is loaded through the external component 80 and the internal component 60 from the exterior of the components and is accessible during assembly.

The internal component 60 includes a plate or wall 62 having an inner surface 64 and an outer surface 66. The internal component 60 includes an opening (not shown) through the wall 62 that is configured to receive the threaded fastener 106. In the illustrated embodiment, the internal component 60 is a frame element, such as a rib or spar of the aircraft 10 (shown in FIG. 1) that forms a structural component of the wing 16 of the aircraft 10. The internal component 60 may be other frame elements of the aircraft 10 in other various examples. The internal component 60 may be another type of component in alternative embodiments. In various examples, the internal component 60 is manufactured from a metal material, such as aluminum, titanium, or other metal material. In other examples, the internal component 60 is manufactured from a composite material, such as a carbon fiber reinforced polymer material.

The external component 80 includes a plate or wall 82 having an inner surface 84 and an outer surface 86. The external component 80 includes an opening (not shown) through the wall 82 is configured to receive the threaded fastener 106. In the illustrated embodiment, the external component 80 is a close-out panel of the aircraft 10, which forms a structural component of the wing 16 of the aircraft 10. For example, the closeout panel of the aircraft 10 may be part of the fuel tank 26. The external component 80 may be a different type of frame element of the aircraft 10 in other various examples. The external component 80 may be another type of component in alternative embodiments. The external component 80 may enclose the internal component 60 such that the internal component 60 is inaccessible from the exterior during assembly. In various examples, the external component 80 is manufactured from a metal material, such as aluminum, titanium, or other metal material. In other examples, the external component 80 is manufactured from a composite material, such as a carbon fiber reinforced polymer material.

The seal cap 102 is coupled to the inner surface 64 of the internal component 60. The seal cap 102 includes a base 110 and a shroud 112 extending from the base 110. The base 110 includes a mounting end 114 that faces the inner surface 64 of the internal component 60. The mounting end 114 of the base 110 abuts against and directly engages the inner surface 64. In an exemplary embodiment, the mounting end 114 is configured to be sealed against the inner surface 64 of the internal component 60. In various embodiments, the base 110 and the shroud 112 are integral with each other formed as a unitary, monolithic structure. In other various embodiments, the base one in the shroud 112 are separate and discrete components coupled to each other. In an exemplary embodiment, the seal cap 102 is manufactured from a dielectric material, such as a thermoplastic material. For example, the seal cap 102 may be a molded part. In various embodiments, the seal cap 102 is manufactured from a polyamide material, such as aliphatic monomers (for example, cycloaliphatic diamine and dodecanedioic acid). In an exemplary embodiment, the seal cap 102 is transparent to allow visual inspection of the nut 104 inside the seal cap 102. The seal cap 102 may be manufactured from a material possessing one or more of the following characteristics including microcrystallinity, medium viscosity, low isotropic shrinkage, low water absorption, high level of UV resistance, dynamic strength, high transmission, excellent optical properties, high dimensional stability, very balanced mechanical property profile, high impact resistance even at low temperatures, high glass transition temperature. The seal cap 102 may be manufactured from a material offering chemical-, abrasion-, scratch- and stress cracking resistance. The seal cap 102 may be manufactured from a material exhibiting rigidity and high heat resistance.

The base 110 includes mounting flanges 116, 118 at opposite sides 120, 122 of the base 110. Greater or fewer mounting flanges may be provided in alternative examples. The mounting flanges 116, 118 are used to mechanically secure the base 110 of the seal cap 102 to the internal component 60. In an exemplary embodiment of the present disclosure, the nut cap assembly 100 includes mounting fasteners 124 coupled to the mounting flanges 116, 118 and the internal component 60. The mounting fasteners 124 are received in mounting openings 126 in the mounting flanges 116, 118. The mounting fasteners 124 are received in openings (not shown) in the internal component 60. In various embodiments, the mounting fasteners 124 are threaded fasteners, such as screws or bolts. In an exemplary embodiment, the mounting fasteners 124 are configured to be sealed to the seal cap 102 and/or the internal component 60. For example, the mounting fasteners 124 are sealed mounting fasteners having a mounting seal 128, also referred to herein as a seal element 128, such as an O-ring, a plug, a sleeve, or a gasket at the interface between the mounting fastener 124 and the internal component 60. The seal element 128 may extend into the mounting opening 126 and/or may extend into the internal component 60.

The shroud 112 includes a nut pocket 130 that receive the nut 104. In an exemplary embodiment, the shroud 112 encloses the nut 104 in the nut pocket 130. For example, the shroud 112 does not include any openings to the nut pocket 130. In an exemplary embodiment, the seal cap 102 includes a cap anti-rotation feature 132 configured to interface with the nut 104 and prevent rotation of the nut 104 in the nut pocket 130. The shroud 112 and/or the base 110 may include the cap anti-rotation feature 132. In an exemplary embodiment, the anti-rotation feature 132 includes a plurality of indentations 134 and a plurality of extensions 136 between the indentations 134. The extensions 136 are received in complementary features of the nut 104. The indentations 134 receive complementary features of the nut 104.

The base 110 includes an opening 140 that receives the nut 104. The opening 140 is open at the mounting end 114 to allow the nut 104 to abut against the inner surface 64 of the internal component 60. The opening 140 is aligned with and open to the nut pocket 130. In various embodiments, the opening 140 is circular. However, the opening 140 may have other shapes in alternative embodiments. In various embodiments, the opening 140 may have the shape of the anti-rotation feature 132 including the undulations of the indentations 134 and the extensions 136.

The base 110 includes a seal groove 142 surrounding the perimeter of the opening 140. In various embodiments, the seal groove 142 may be ring shaped. The seal groove 142 may have other shapes in alternative embodiments. The seal groove 142 receives a seal 144 configured to seal against the base 110 and the internal component 60. The seal 144 forms a seal interface 146 around the opening 140 between the seal cap 102 and the internal component 60. For example, the seal interface 146 is defined between the seal 144 in the internal component 60 and the seal interface 146 is defined between the seal 144 and the base one within the seal groove 142. The seal 144 may be manufactured from a synthetic rubber material, such as a polysulfide material. In various embodiments, the seal material may be aerospace grade sealant material, such as aircraft fuel tank sealant. In various embodiments, the seal 144 is an O-ring or gasket placed in the seal groove 142 and compressed between the base 110 and the internal component 60 to create a circumferential seal around the opening 140. In other various embodiments, the seal 144 is a sealing compound injection molded into the seal groove 142 after the nut cap assembly 100 is secured to the internal component 60. For example, the base 110 includes injection ports 148 open at the exterior of the base 110 configured to receive injectable sealing material that forms the seal 144. As such, the seal 144 may be formed in place between the seal cap 102 and the internal component 60. In various embodiments, the base one includes a pair of injection ports 148 on opposite sides of the seal cap 102. For example, the injection ports 148 may be approximately centered between the mounting flanges 116, 118.

The nut 104 is received in the nut pocket 130 and is configured to receive the threaded fastener 106. The nut 104 includes a head 160 and a ring 162 extending from the head 160. The nut 104 includes a threaded bore 164 extending through at least one of the head 160 and the ring 162. The threaded fastener 106 is threadably coupled into the threaded bore 164. In an exemplary embodiment, the nut 104 is manufactured from a metal material, such as aluminum. The nut 104 may be plated, such as with the zinc and/or nickel plating. The nut 104 may be manufactured from other materials in alternative embodiments, such as titanium. In other various embodiments, the nut 104 may be manufactured from a carbon fiber reinforced polymer material. In various embodiments, the nut 104 is passivated or may incur other treatment, such as to render the surfaces less reactive chemically or to have other enhancements. The nut 104 may have a dry film lubricant applied to one or more surfaces of the nut 104, such as in the threaded bore 164.

In an exemplary embodiment, the nut 104 includes nut anti-rotation features 166 configured to interface with the cap anti-rotation features 132 to prevent rotation of the nut 104 relative to the seal cap 102 in the nut pocket 130. The head 160 includes the nut anti-rotation features 166. Optionally, the ring 162 may include the nut anti-rotation features 166. In an exemplary embodiment, the nut anti-rotation features 166 include a plurality of indentations 174 and a plurality of extensions 176 between the indentations 174. The extensions 176 are received in the indentations 134 of the seal cap 102 and the indentations 174 receive the extensions 136 of the seal cap 102 to prevent rotation of the nut 104 relative to the seal cap 102. In an exemplary embodiment, the nut pocket 130 is slightly larger than the nut 104 to allow a limited amount of floating movement of the nut 104 in the nut pocket 130, such as for assembly and manufacturing tolerances. For example, the nut pocket 130 may allow approximately 0.010" of float. The amount of float is relatively small to ensure alignment of the nut 104 within the seal cap 102 during assembly with the threaded fastener 106.

Figure 4:
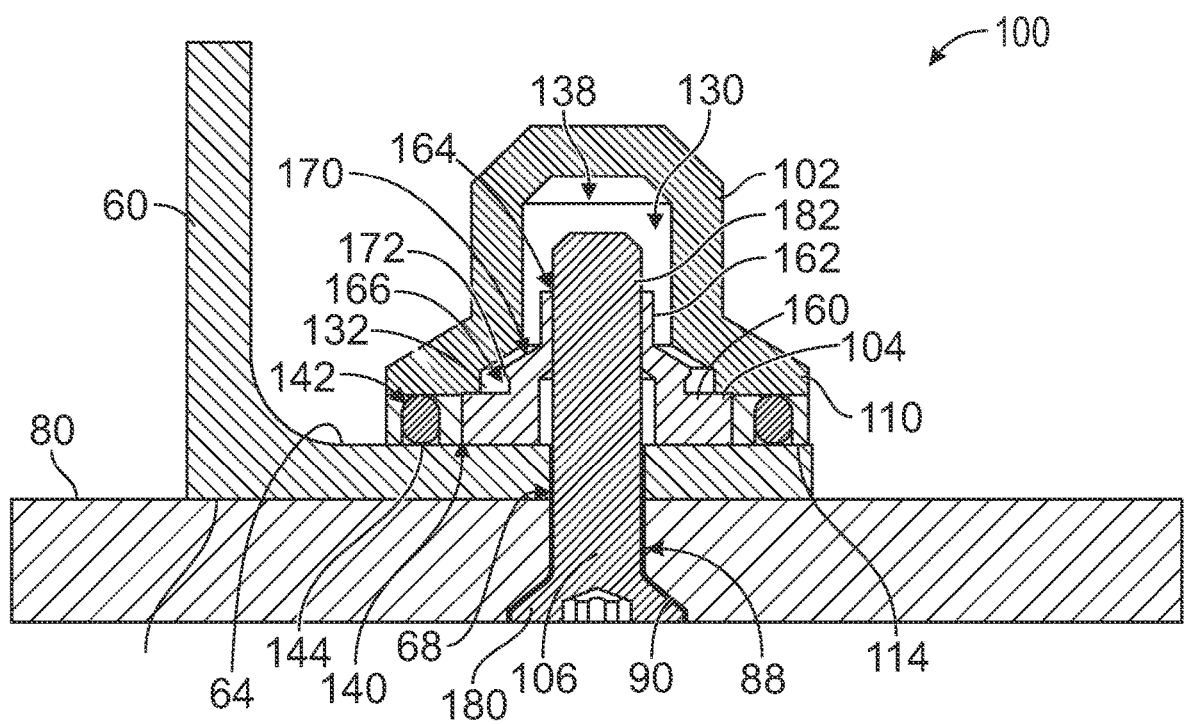
FIG. 4 is a cross-sectional view of the nut cap assembly in accordance with an exemplary embodiment taken along line 4-4 shown in FIG. 3.
Figure 5:
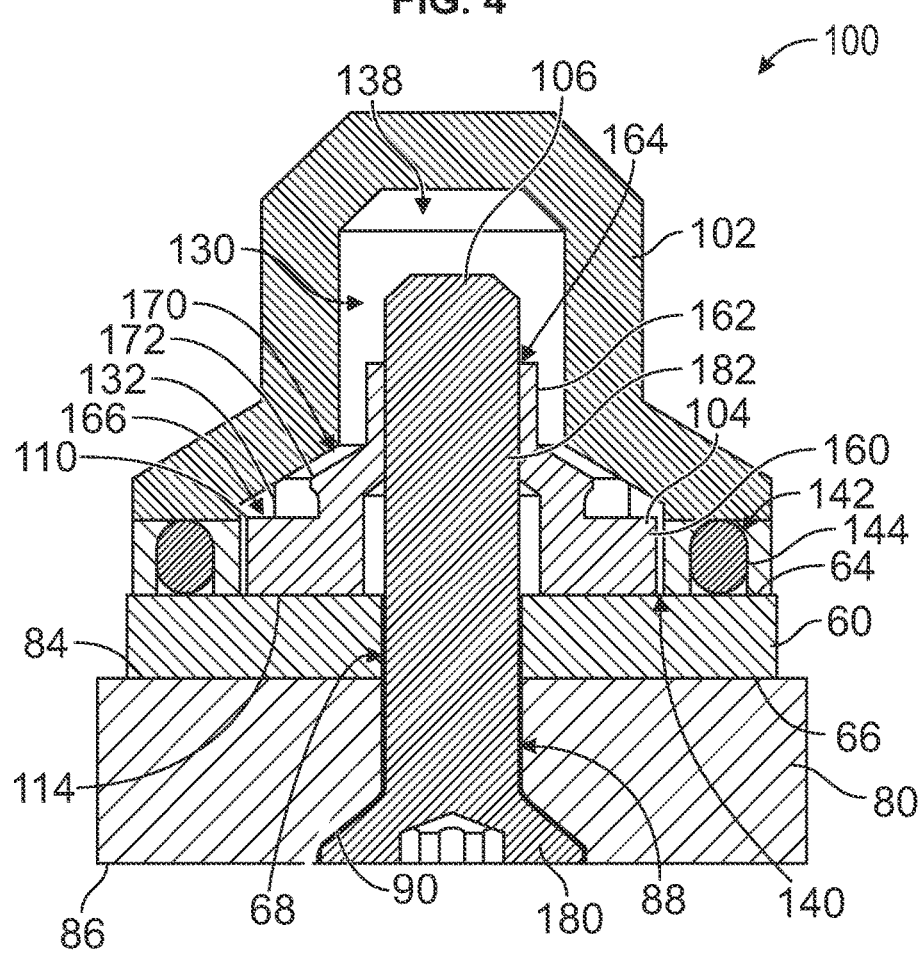
FIG. 5 is an enlarged cross-sectional view of the nut cap assembly shown in FIG. 4.
Figure 6:
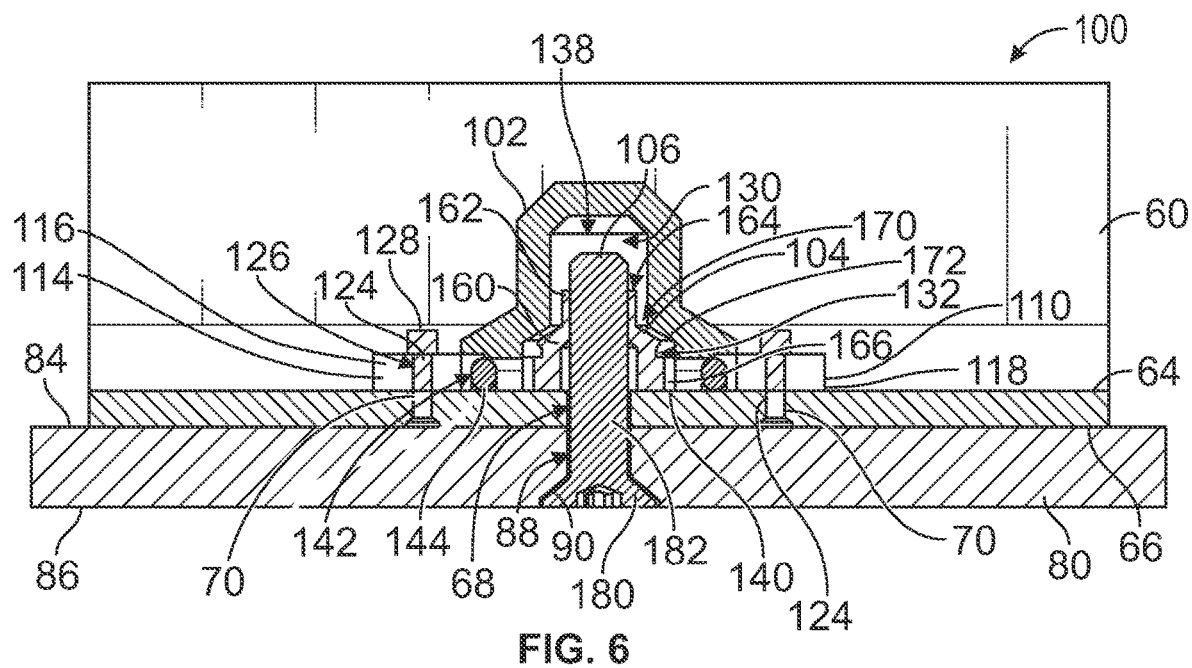
FIG. 6 is a cross-sectional view of the nut cap assembly in accordance with an exemplary embodiment taken along line 6-6 shown in FIG. 3.

FIG. 4 is a cross-sectional view of the nut cap assembly 100 in accordance with an exemplary embodiment taken along line 4-4 shown in FIG. 3. FIG. 5 is an enlarged cross-sectional view of the nut cap assembly 100 shown in FIG. 4. FIG. 6 is a cross-sectional view of the nut cap assembly 100 in accordance with an exemplary embodiment taken along line 6-6 shown in FIG. 3. When assembled, the nut cap assembly 100 is coupled to the internal component 60. The threaded fastener 106 is coupled to the external component 80. The threaded fastener 106 is threadably coupled to the nut 104 to secure the internal component 60 to the external component 80.

When assembled, the nut 104 is received in the nut pocket 130. The nut anti-rotation features 166 interface with the cap anti-rotation features 132 to locate the nut 104 in the nut pocket 130. The threaded bore 164 of the nut 104 is positioned in the nut pocket 130 to receive the threaded fastener 106. In an exemplary embodiment, the nut 104 includes a beveled section 170 between the head 160 and the ring 162. The beveled section 170 extends at an angle non-perpendicular to the ring 162. The nut pocket 130 may be similarly angled or pitched to receive the beveled section 170. The angled surface of the nut pocket 130 may be used to position the nut 104 in the nut pocket 130. In an exemplary embodiment, the nut 104 includes a lip 172 between the head 160 and the ring 162 and/or the beveled section 170. The nut 104 is undercut between the lip 172 and the head 160. The lip 172 may be used to snap fit the nut 104 to the seal cap 102 in the nut pocket 130. For example, a portion of the seal cap 102 may be received in the undercut space between the lip 172 and the head 160. The lip 172 is used to position and/or retain the nut 104 in the nut pocket 130.

In an exemplary embodiment, the nut cap assembly 100 is coupled to the inner surface 64 of the internal component 60. The outer surface 66 of the internal component 60 faces the inner surface 84 of the external component 80. The threaded fastener 106 is coupled to the outer surface 86 of the external component 80 and passes through an opening 88 and the extra component 80 as well as an opening 68 in the internal component 60. The threaded fastener 106 passes through the opening 140 at the mounting end 114 of the seal cap 102 and extends into the nut pocket 130 to interface with the nut 104. The threaded fastener 106 includes a head 180 and a threaded shaft 182 extending from the head 180. The head 180 is received in a counterbore 90 at the outer surface 86 of the external component 80. The outer end of the head 180 may be flush with or recessed relative to the outer surface 86 of the external component 80. The threaded shaft 182 passes through the opening 88 and the opening 68 into the seal cap 102. The threaded shaft 182 is received in the threaded bore 164 of the nut 104. The threaded shaft 182 is threadably coupled to the nut 104 at the threaded bore 164. In an exemplary embodiment, the nut pocket 130 is oversized relative to the nut 104 creating a space 138 beyond the nut 104 configured to receive the end of the threaded shaft 182. The space 138 may be sufficiently sized to receive different length threaded fasteners 106. For example, the seal cap 102 provides sufficient clearance beyond the nut 104 to ensure that the end of the threaded shaft 182 does not engage press against the seal cap 102 and press the seal cap 102 away from the internal component 60.

The mounting end 114 of the base 110 of the seal cap 102 is mounted to the internal component 60. The mounting fasteners 124 (FIG. 6) secure the mounting flanges 116, 118 (FIG. 6) to the internal component 60. In an exemplary embodiment, the mounting fasteners 124 include the seal elements 128, which provide sealing between the mounting fasteners 124 and the internal component 60. The seal elements 128 prevent fluid leakage through the internal component 60. The seal elements 128 may be used to prevent electrical conduction through the mounting fasteners 124 to the interior of the components, such as to prevent spark or arcing during a lightning strike event. In various embodiments, each seal element 128 may be an O-ring, a plug, a sleeve, or a gasket surrounding the mounting fastener 124. The seal element 128 may be a coating applied to the mounting fastener 124. The seal element 128 may extend along a shaft 125 of the corresponding mounting fastener 124. The seal elements 128 may be located at the interface between the mounting flanges 116, 118 and the internal component 60. The seal elements 128 may extend into the internal component 60, such as into openings 70 in the internal component 60 that receive the mounting fasteners 124. The seal elements 128 may extend into the mounting openings 126 in the mounting flanges 116, 118. In an exemplary embodiment, the mounting fasteners 124 may be assembled from the outer surface 66 of the internal component 60. For example, the nut cap assembly 100 may be coupled to the internal component 60 prior to positioning the internal component 60 relative to the external component 80.

In an exemplary embodiment, the seal cap 102 is sealed to the internal component 60. The seal 144 provides the seal interface between the seal cap 102 and the internal component 60. The seal 144 is located in the seal groove 142 and is configured to interface with the inner surface 64 of the internal component 60. In an exemplary embodiment, the seal 144 provides circumferential sealing entirely around the opening 140 and the nut pocket 130. The seal 144 prevents fluid leakage into the nut pocket 130 and/or through the openings 68, 88 of the internal component 60 and the external component 80. The seal 144 may be used to prevent electrical conduction from the threaded fastener 106 and/or the nut 104 to the interior of the components, such as to prevent spark or arcing from escaping the nut pocket 130 during a lightning strike event.

In an exemplary embodiment, during assembly, the nut 104 is loaded into the nut pocket 130 of the seal cap 102 by interfacing the nut anti-rotation feature 166 with the cap anti-rotation feature 132 to prevent rotation of the nut 104 in the nut pocket 130. For example, the nut 104 is positioned in the nut pocket 130 such that an inner end 161 of the head 160 of the nut 104 is coplanar with the mounting end 114 of the seal cap 102 to directly abut against the internal component 60. The mounting end 114 of the seal cap 102 is mounted to the inner surface 64 of the internal component 60 with the seal groove 142 of the seal cap 102 facing the internal component 60. For example, the mounting flanges 116, 118 of the seal cap 102 are mounted to the internal component 60 using the sealed mounting fasteners 124 to provide a sealed interface between the mounting fastener 124 and the internal component 60. The seal 144 is provided in the seal groove 142 to seal between the seal cap 102 and the internal component 60. For example, the seal 144 is injection molded into the seal groove 142 through the injection port(s) 146 of the seal cap 102. During assembly, the threaded fastener 106 is threadably coupled to the threaded bore 164 of the nut 104 to secure the outer surface 66 of the internal component 60 to the inner surface 84 of the external component 80. The threaded fastener 106 is installed from the exterior 81 of the external component 80.

Figure 7:
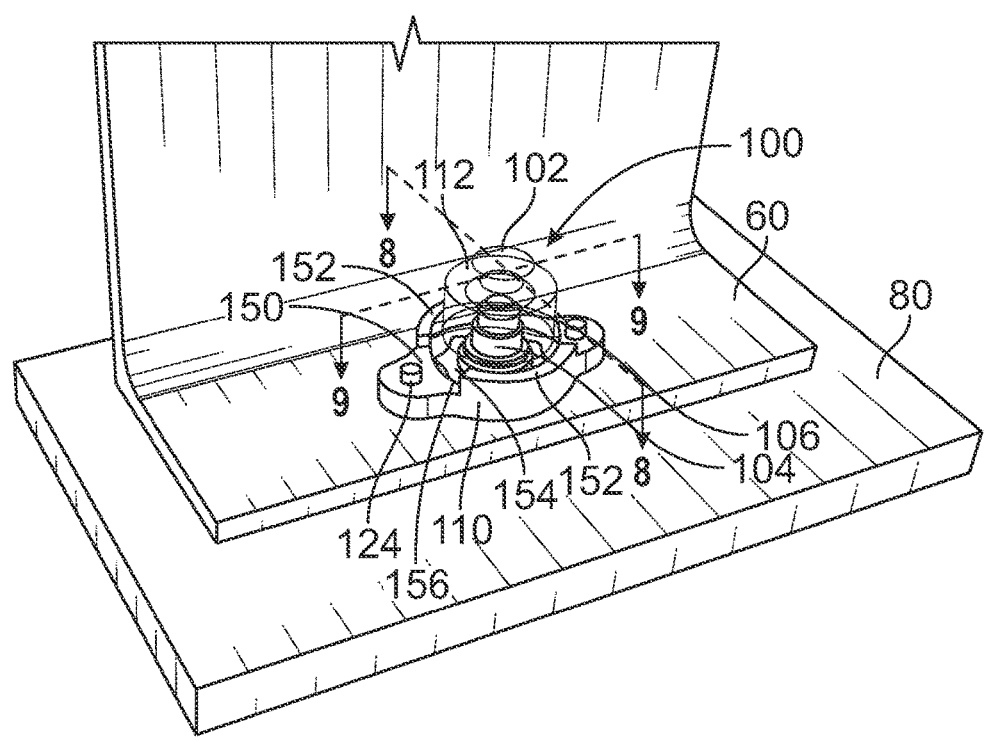
FIG. 7 is a perspective view of the nut cap assembly in accordance with an exemplary embodiment for securing the internal component to the external component.
Figure 8:
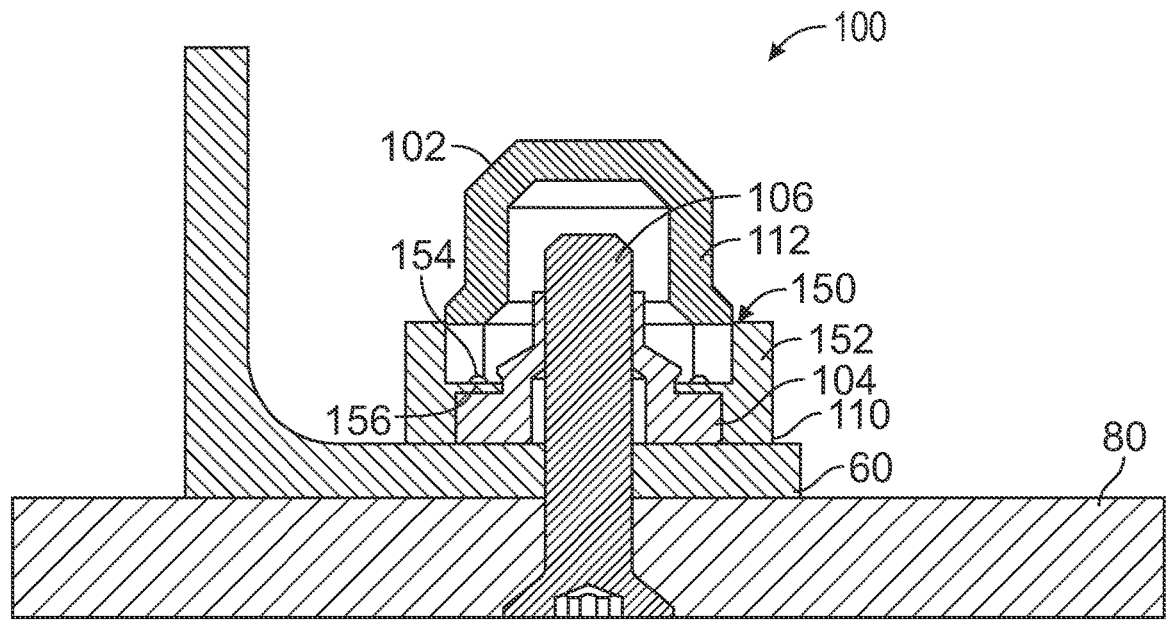
FIG. 8 is a cross-sectional view of the nut cap assembly in accordance with an exemplary embodiment taken along line 8-8 shown in FIG. 7.
Figure 9:
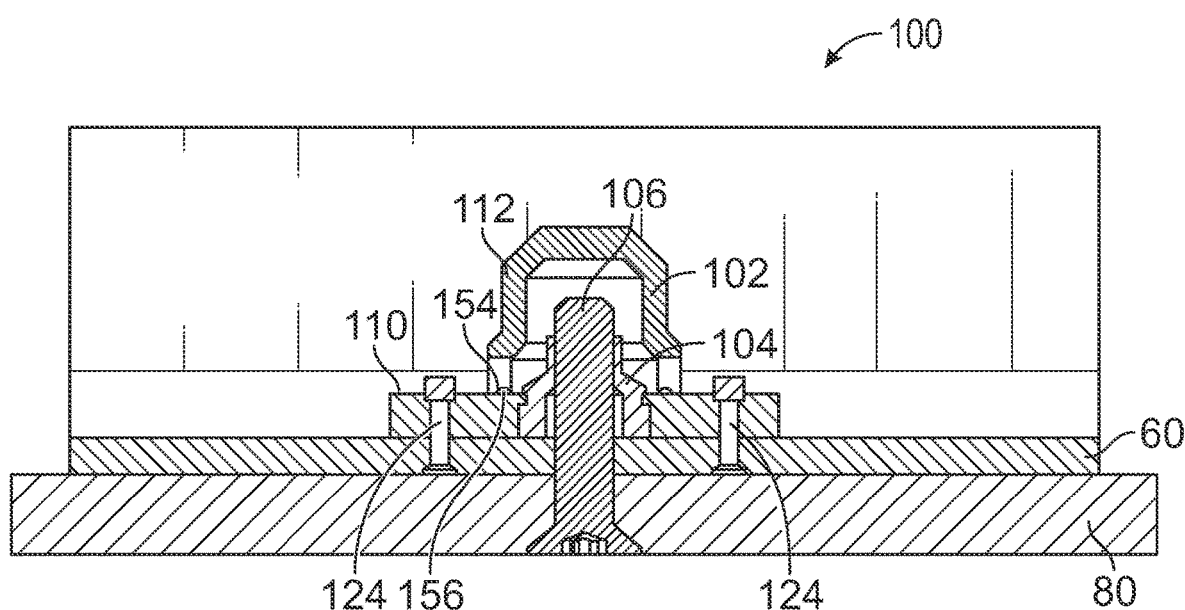
FIG. 9 is a cross-sectional view of the nut cap assembly in accordance with an exemplary embodiment taken along line 9-9 shown in FIG. 7.

FIG. 7 is a perspective view of the nut cap assembly 100 in accordance with an exemplary embodiment for securing the internal component 60 to the external component 80. FIG. 8 is a cross-sectional view of the nut cap assembly 100 in accordance with an exemplary embodiment taken along line 8-8 shown in FIG. 7. FIG. 9 is a cross-sectional view of the nut cap assembly 100 in accordance with an exemplary embodiment taken along line 9-9 shown in FIG. 7. In the illustrated embodiment, the seal cap 102 of the nut cap assembly 100 is a multi-piece seal cap. The shroud 112 is separate and discrete from the base 110. The shroud 112 is coupled to the base 110 to provide a closed and sealed environment around the nut 104 and the threaded fastener 106.

The base 110 is coupled to the internal component 60 using the mounting fasteners 124. In an exemplary embodiment, the base 110 includes a shroud pocket 150 defined by support walls 152. The shroud 112 is received in the shroud pocket 150 and coupled to the base 110, such as to the support walls 152. For example, the shroud 112 may be coupled to the support walls 152 using adhesive, epoxy or other securing compounds. In other various embodiments, the shroud 112 is threadably coupled to the base 110. For example, the shroud 112 may include external threads and the support walls 152 may include internal threads. In an exemplary embodiment, a seal 154 may be provided between the shroud 112 and the base 110 to provide a seal interface between the shroud 112 and the base 110. For example, the seal 154 is received in a seal groove 156.

In an exemplary embodiment, the base 110 is manufactured from a dielectric material, such as a thermoplastic material. For example, the base 110 may be a molded part. In an exemplary embodiment, the shroud 112 is manufactured from a different material from the base 110. The shroud 112 may be manufactured from a dielectric material, such as a thermoplastic material. In an exemplary embodiment, the shroud is transparent to allow visual inspection of the nut 104.

Figure 10:
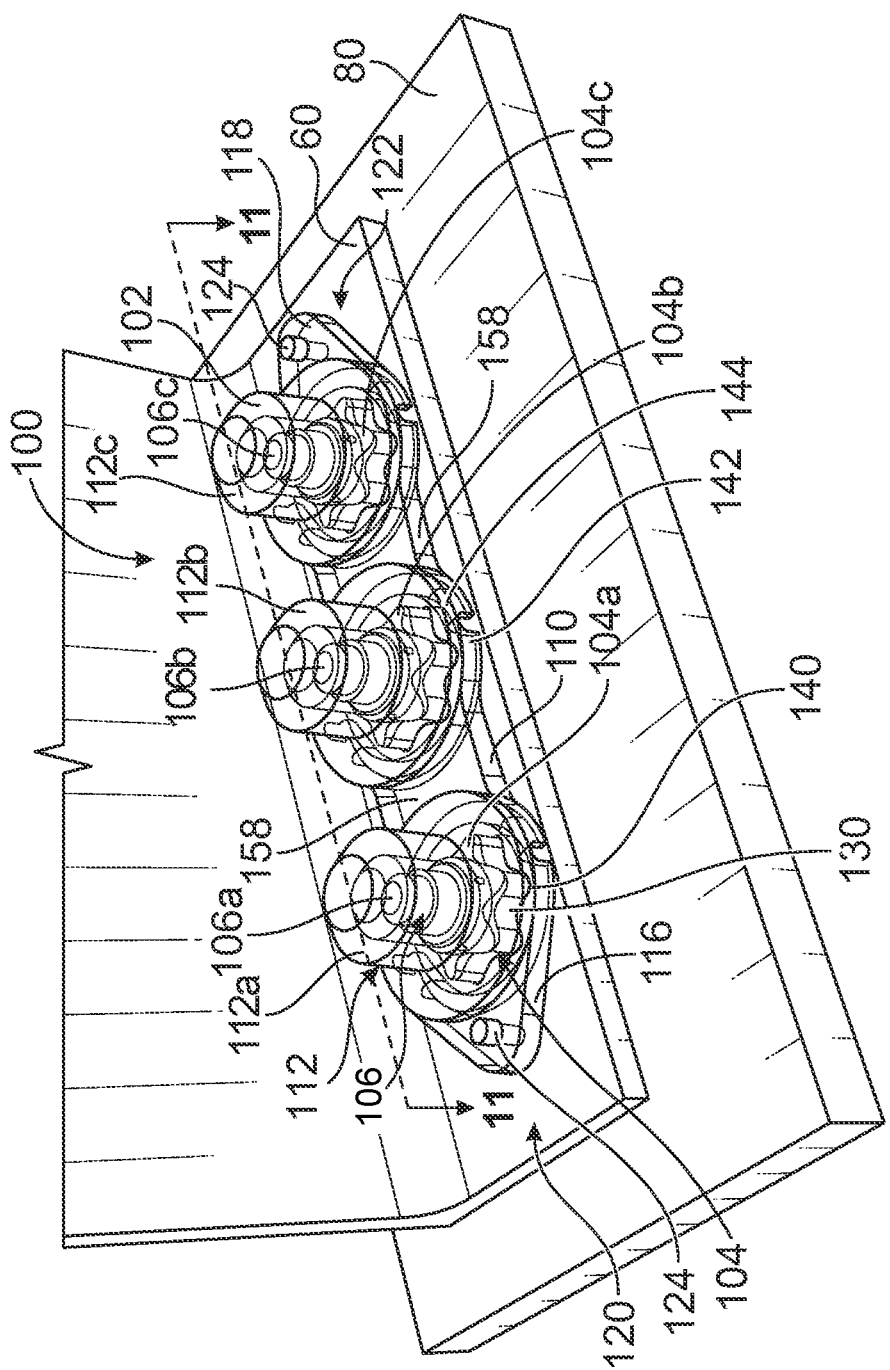
FIG. 10 is a perspective view of the nut cap assembly in accordance with an exemplary embodiment for securing the internal component to the external component.
Figure 11:
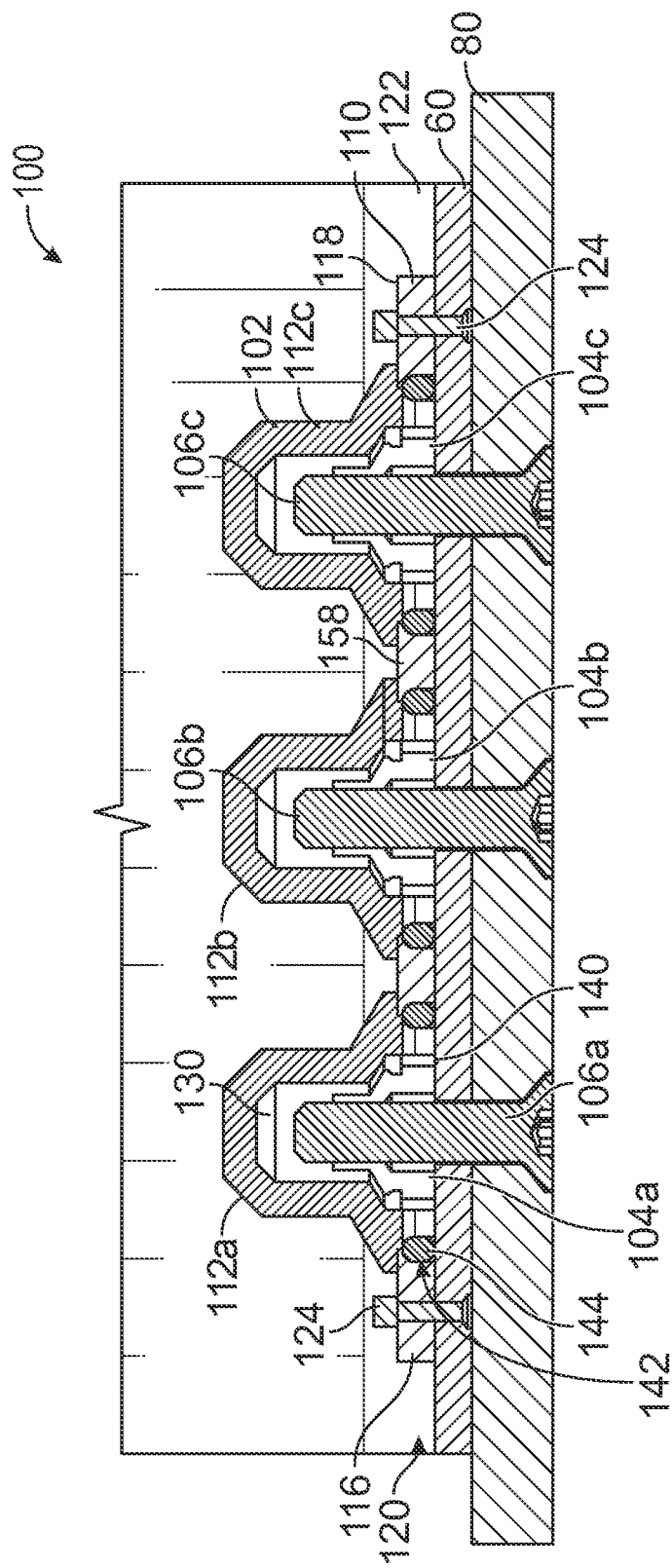
FIG. 11 is a cross-sectional view of the nut cap assembly in accordance with an exemplary embodiment taken along line 11-11 shown in FIG. 10.

FIG. 10 is a perspective view of the nut cap assembly 100 in accordance with an exemplary embodiment for securing the internal component 60 to the external component 80. FIG. 11 is a cross-sectional view of the nut cap assembly 100 in accordance with an exemplary embodiment taken along line 11-11 shown in FIG. 10. In the illustrated embodiment, the seal cap 102 includes a plurality of shrouds 112 extending from the base 110. In the illustrated embodiment, the seal cap 102 includes three shrouds, identified as a first shroud 112a, a second shroud 112b, and a third shroud 112c. The base 110 is mounted to the internal component 60 to position the plurality of shrouds 112 relative to the internal component 60 to receive corresponding nuts 104 and threaded fasteners 106.

In an exemplary embodiment, the base 110 includes the mounting flanges 116, 118 at the opposite sides 120, 122 of the base 110. The mounting fasteners 124 secure the base 110 to the internal component 60. In an exemplary embodiment, the base 110 includes webs 158 between the shrouds 112. In the illustrated embodiment, the seal cap 102 includes three shrouds 112 and two webs 158. However, the seal cap 102 may include greater or fewer shrouds 112 and corresponding webs 158 in alternative embodiments. The base 110 includes an opening 140 for each shroud 112 providing access to the nut pocket 130 of the corresponding shroud 112 (for example, first nut pocket 130a, second nut pocket 130b, third nut pocket 130c for the first shroud 112a, second shroud 112b, and third shroud 112c, respectively). The nut pocket 130 holds a corresponding nut 104 (for example, first nut 104a, second nut 104b, and third nut 104c) and is configured to receive a corresponding threaded fastener 106 (for example, first threaded fastener 106a, second threaded fastener 106b, and third threaded fastener 106c). In an exemplary embodiment, the base 110 includes a seal groove 142 for each shroud 112 that receives a corresponding seal 144 to seal around the opening 140. In an alternative embodiment, the base 110 includes a single seal groove 142 that surrounds all of the openings and receives a corresponding (single) seal 144 to seal around the openings 140.

Further, the disclosure comprises embodiments according to the following clauses:

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A nut cap assembly for securing an internal component to an external component, the nut cap assembly comprising:
   a seal cap having a base and a shroud extending from the base, the base including a mounting flange configured to be mounted to the internal component, the base including an opening at a mounting end of the base configured to be mounted to the internal component, the base including a seal groove surrounding the opening configured to receive a seal, the seal groove being open at the mounting end to interface the seal with the internal component, the shroud including a nut pocket having a cap anti-rotation feature; and
   a nut received in the nut pocket, the nut including a threaded bore configured to threadably receive a threaded fastener used to secure the internal component to the external component, the nut including a nut anti-rotation feature interfacing with the cap anti-rotation feature.

2. The nut cap assembly of claim 1, wherein the base of the seal cap directly engages the nut and is configured to directly engage the internal component.

3. The nut cap assembly of claim 1, wherein the seal cap is manufactured from a transparent, dielectric material to visually inspect the nut in the nut pocket.

4. The nut cap assembly of claim 1, further comprising a mounting fastener coupled to the mounting flange, the mounting fastener configured to be coupled to the internal component to secure the seal cap to the internal component.

5. The nut cap assembly of claim 4, wherein the mounting fastener includes a mounting seal providing a sealed interface between the mounting fastener and the internal component.

6. The nut cap assembly of claim 5, wherein the mounting seal is an O-ring surrounding a shaft of the mounting fastener.

7. The nut cap assembly of claim 1, wherein the shroud is integral with the base as a unitary, monolithic seal cap.

8. The nut cap assembly of claim 1, wherein the base includes a shroud pocket, the shroud being received in the shroud pocket and coupled to the base.

9. The nut cap assembly of claim 1, wherein the shroud is a first shroud and the nut pocket is a first nut pocket, the seal cap including a second shroud extending from the base forming a second nut pocket receiving a second nut.

10. The nut cap assembly of claim 1, further comprising a seal received in the seal groove, the seal providing a seal interface around the opening between the seal cap and the internal component.

11. The nut cap assembly of claim 1, wherein the base includes an injection port open to the seal groove, a seal being injection molded into the seal groove through the injection port.

12. The nut cap assembly of claim 1, wherein the nut pocket includes a nut pocket extension beyond the nut to receive different length threaded fasteners through the nut.

13. A nut cap assembly for securing an internal component to an external component, the nut cap assembly comprising:
- a seal cap having a base and a shroud extending from the base, the base including a mounting flange configured to be mounted to the internal component, the mounting flange having a mounting opening, the base including an opening at a mounting end of the base configured to be mounted to the internal component, the base including a seal groove surrounding the opening, the seal groove being open at the mounting end, the shroud including a nut pocket having a cap anti-rotation feature;
- a mounting fastener received in the mounting opening, the mounting fastener including a mounting seal providing a sealed interface between the mounting fastener and the internal component;
- a seal received in the seal groove, the seal providing a seal interface around the opening between the seal cap and the internal component; and
- a nut received in the nut pocket, the nut including a threaded bore configured to threadably receive a threaded fastener used to secure the internal component to the external component, the nut including a nut anti-rotation feature interfacing with the cap anti-rotation feature.

14. The nut cap assembly of claim 13, wherein the base of the seal cap directly engages the nut and is configured to directly engage the internal component.

15. The nut cap assembly of claim 13, wherein the seal cap is manufactured from a transparent, dielectric material to visually inspect the nut in the nut pocket.

16. The nut cap assembly of claim 13, wherein the mounting seal is an O-ring surrounding a shaft of the mounting fastener.

17. A method of assembling an internal component to an external component comprising:
- loading a nut in a nut pocket of a seal cap by interfacing a nut anti-rotation feature of the nut with a cap anti-rotation feature of the seal cap to prevent rotation of the nut in the nut pocket of the seal cap;
- mounting a mounting end of the seal cap to an inner surface of the internal component with a seal groove of the seal cap facing the internal component;
- providing a seal in the seal groove to seal between the seal cap and the internal component;
- threadably coupling a threaded fastener to a threaded bore of the nut to secure an outer surface of the internal component to the external component, the threaded fastener being installed from an exterior of the external component.

18. The method of claim 17, wherein said mounting a mounting end of the seal cap comprises securing a mounting flange of the seal cap to the internal component using a sealed mounting fastener to provide a sealed interface between the mounting fastener and the internal component.

19. The method of claim 17, wherein said providing a seal in the seal groove comprises injection molding the seal into the seal groove through an injection port of the seal cap.

20. The method of claim 17, wherein said loading a nut into a nut pocket includes positioning the nut in the nut pocket such that an inner end of the nut is coplanar with the mounting end of the seal cap to directly abut against the internal component.

* * * * *